Figure 1:
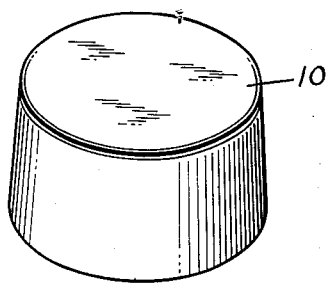

May 25, 1954

C. K. SWARTZ 2,679,473

METHOD OF PREPARING MOLDS TO PRODUCE
CRACKLE AND OTHER SURFACE FINISHES
ON MOLDED PLASTIC ARTICLES

Filed May 23, 1952

INVENTOR.
CHARLES K. SWARTZ
BY
HIS ATTORNEYS.

Patented May 25, 1954

2,679,473

UNITED STATES PATENT OFFICE 2,679,473

METHOD OF PREPARING MOLDS TO PRODUCE CRACKLE AND OTHER SURFACE FINISHES ON MOLDED PLASTIC ARTICLES

Charles K. Swartz, Scranton, Pa., assignor to Consolidated Molded Products Corporation, Scranton, Pa., a corporation of Delaware Application May 23, 1952, Serial No. 289,559

3 Claims. (Cl. 204—6)

This invention relates to molds for plastic articles and to methods of making such molds and it relates more particularly to methods of preparing molds to produce crackle, wrinkle, crystal and other texture finishes on molded plastic articles and to the resulting molds.

The use of texture finishes on metallic articles such as typewriters and other business machines, cabinets for electronic equipment and the like is wide spread. In some instances, the use of a textured finish, such as a crystal or crackle finish, together with a selected color identifies the products with the manufacturer so that to some extent the surface finish and color has acquired a meaning which indicates the origin of the goods.

It has been found that many of the metallic parts of business machines and the like can be formed more economically of plastic than of metal and the plastic parts are equally serviceable under ordinary conditions of use. However, it is difficult to obtain the proper finish on the plastic parts with the use of the conventional texture enamels, lacquers or paints (referred to hereinafter as texture enamel) and, moreover, the finishing operations involved minimize to a degree the price differential between the plastic and metallic parts.

Efforts have been made to provide molds which are capable of molding on the surface of plastic articles or parts thereof a finish which corresponds to the desired texture finish provided by texture enamel. However, even the best engraving and tooling procedures have not been able to produce an exact duplicate of a texture finish and moreover the cost of the preparation of such molds is prohibitive.

The present invention relates to a simplified and economical method of producing molds which are capable of forming texture finishes on the surface or surfaces of plastic articles which are indistinguishable from the finishes which are produced with texture enamel. More particularly, the method involves the preparation of a model of the article to be produced, this model forming the basis for the production of the desired mold. The article is then painted with a texture enamel, and baked or otherwise treated to produce the desired texture surface finish. The article is treated to render its surfaces electrically conductive and it is then electroplated. Inasmuch as the finished mold may be subjected to high pressures and temperatures in use, the metal which is plated on the model preferably is a hard metal such as iron or nickel. The plating is carried on until a shell of substantial thickness is formed. After the shell has been formed, it is removed by heating it to expand and free it from the model. The resulting shell has a surface which is complementary to the textured finish on the model and thus is capable of duplicating the surface finish of the model when used in a molding operation. If the shell is of substantial thickness, it may be used without reinforcement by mounting it suitably in the molding apparatus. However, it is preferred to mount the shell in a metal backing formed of iron or steel which is shrunk on the shell to strengthen and reinforce it. Such a reinforced mold is capable of withstanding the high pressures and temperatures encountered in plastic molding apparatus.

By producing molds in the manner described, it is possible to obtain more faithful reproductions of textured surfaces than is possible with engraving and etching operations.

Figure 2:
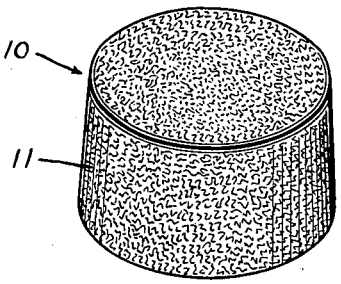
Figure 3:
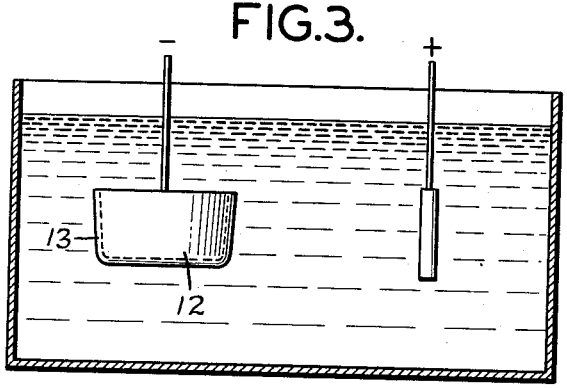
Figure 4:
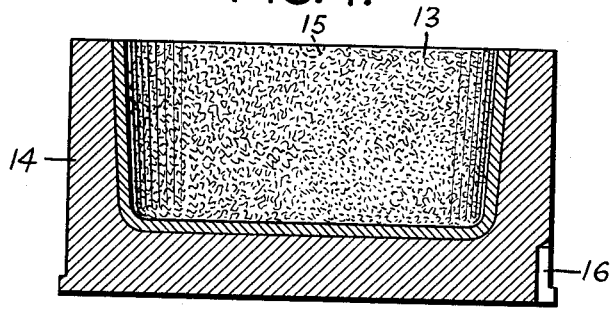

For a better understanding of the present invention, reference may be had to the accompanying drawing, in which:

Figs. 1, 2 and 3 disclose successive steps in the manufacture of a mold shell; and Fig. 4 is a view in section through a typical mold embodying the present invention.

The invention will be described with respect to the production of a mold for reproducing an article 10, such as that shown in Fig. 1 of the drawings which is generally frusto-conical in shape and to which is imparted a textured finish, such as that produced with texture enamel. The model 10 may be formed of almost any type of material which is capable of withstanding a temperature on the order of 250° F. which is above the normal baking temperature for texture enamels.

The first step in the operation is to spray the model 10 with a texture enamel thinned to the proper consistency. Inasmuch as such spraying techniques and texture enamels are well known, further description of this operation is believed unnecessary.

When a uniform heavy wet coat of the texture enamel has been applied to the model 10, the enamel is allowed to air dry for about three minutes to set the coating. The coated article is then transferred to a baking oven where it is baked for about two hours at about 225° F. to produce the desired texture, i. e., crackle, crystal, wrinkle, etc. The temperature and time of baking will, of course, vary depending upon the type of texture enamel used. The minimum thickness of the finish should be not substantially less than .0035 inch after thorough drying and baking. The next step in the operation is to put the model in condition for electroplating. Inasmuch as the texture surface 11 of the article is non-conductive, it must be rendered conductive in order to electro-deposit a metal thereon. To this end, the model is washed thoroughly in a dilute stannous chloride solution and thereafter sprayed with 20% silver nitrate solution and dried to render the surface 11 conductive.

The model 10 is immersed in an acid copper plating solution and given a flash coating of copper. The copper plating operation is conventional. A flash coating of copper can be deposited on the model in about a half hour. The copper plate conforms accurately to the texture and configuration of the model 10 and its texture surface 11. The model is then transferred to another plating tank where another heavier layer of metal 12 is plated on the model to form a shell 13. The metal 12 deposited in this tank may be iron or nickel inasmuch as both of these metals are hard and capable of withstanding the molding temperatures and pressures used in plastic molding operations.

A typical nickel plating solution which gives good results may, in about the following proportions, consist of:

| | |
|---|---|
| Nickel ammonium sulfate | 25½ oz. |
| Ammonium sulfate | 8 oz. |
| Crystallized citric acid | 1¾ oz. |
| Water | 10 to 12 qts. |

The nickel may be deposited on the copper layer on the model from this bath at a current density at about 0.34 ampere per square cm., and about 2.0 to 2.2 volts with about 10 centimeters electrode spacing.

A shell of iron may be electro-deposited on the model from a bath containing in about the following proportions:

| | |
|---|---|
| Ferrous ammonium sulfate | 1¼ oz. |
| Crystallized citric acid | 0.88 oz. |
| Water | 1 qt. | and sufficient ammonia to produce a neutral or slightly acid reaction.

The iron can be deposited on the copper surface of the model 10 at a current density of about 0.3 ampere per square centimeter and about 2 volts at an electrode spacing of about 10 centimeters.

The electroplating operation is continued until a shell 13 of substantial thickness is deposited on the copper plated surface of the model 10. Preferably, electroplating should be continued until the shell has attained the thickness of a minimum of about one-eighth of an inch, as shown in Fig. 3.

After the shell 13 has been deposited to the desired thickness, the plated model is removed from the plating tank and the shell 13 is heated slightly to expand it and release it from the model 10. If any of the texture enamel adheres to the inner surface of the shell, it can be removed with paint thinner or the like. The copper flashed surface of the shell in contact with the model will be a faithful reproduction of the texture of the surface of the model.

Under some conditions, as for example, when the molding pressures used in the preparation of plastic articles are low, the shell 13 is strong enough in itself to be used directly as a mold, without reinforcement. However, when the shell 13 is on the order of about ⅛ inch thick, it may be desirable to provide a backing for the shell, especially when it is to be subjected to high molding pressures. As shown in Fig. 4, the shell can be mounted in a hollowed out block of steel 14, or other strong material which is shrunk on, or otherwise secured to the shell. It will be understood, that the backing block 14 may be provided with the usual sprue groove 15 or passage and keyways 16 or openings for receiving aligning and locating pins on the press as may be required.

The method described above can be used for producing molds to give an all over textured finish to the molded plastic articles or they may be produced to give in part a texture finish and, in part, a smooth finish, as desired, by suitably painting, enameling or lacquering the model. Thus, for example, etched effects can be imparted to translucent or opaque plastic articles by painting or printing localized areas of a model with texture finishes. In this way plastic articles having engraved or etched designs, monograms, lettering and the like, or substantially any type of finely textured surface can be produced without expensive and time consuming engraving, etching and the like on the model or the finished plastic articles.

While it is preferred to form a shell of nickel or iron, it will be understood that other metals which are commonly electroplated, may be used with equally satisfactory results. Therefore, the example of the invention described above should be considered as illustrative and not as limiting the scope of the following claims.

I claim:

1. A method of making a mold for forming plastic articles having a textured surface, comprising applying to a surface of a model of an article to be reproduced in plastic a coating of a texture enamel, treating the enamel to develop its texture, applying a conductive material to the surfaces of the model to be reproduced, electro-depositing a metal of the class consisting of iron and nickel on the conductive surfaces of the article to form a shell about one-eighth of an inch thick capable of withstanding the pressures involved in the molding of plastic articles, said shell having a surface portion complemental to the texture surface on the article, and removing the shell from the article.

2. A method of making a mold for forming plastic articles having a textured surface, comprising applying to a surface of a model of an article to be reproduced in plastic a coating of a texture enamel, baking the enamel to develop the texture thereof, applying a conductive material to the surfaces of the model to be reproduced to render the enamel thereon conductive, electrodepositing a flash coating of copper on the conductive surface of the model, electrodepositing a thick layer of hard metal of the class consisting of nickel and iron on the flash coating of copper to form a strong shell of substantial thickness and having a surface portion complemental to the surface of the model to be reproduced, and mounting a rigid backing support on the shell to produce a composite mold capable of withstanding high plastic molding pressures.

3. The method of making a mold set forth in claim 1 comprising applying to the shell a rigid backing to form a composite mold.

References Cited in the file of this patent

UNITED STATES PATENTS

| Number | Name | Date |
|---|---|---|
| 243,306 | Sachs | June 21, 1881 |
| 556,975 | Herkomer et al. | Mar. 24, 1896 |
| 956,764 | Gerb | May 3, 1910 |
| 1,208,808 | McIndoe et al. | Dec. 19, 1916 |
| 1,831,309 | Laukel | Nov. 10, 1931 |
| 1,834,763 | Bonsieur | Dec. 1, 1931 |
| 1,930,826 | Scott et al. | Oct. 17, 1933 |
| 2,019,590 | Westra | Nov. 5, 1935 |
| 2,182,775 | Abouchar | Dec. 12, 1939 |
| 2,236,398 | Drummond | Mar. 25, 1941 |